United States Patent

[11] 3,623,793

| [72] | Inventors | Barron C. Merten;<br>Germain G. Pins, both of Columbus, Ind. |
|---|---|---|
| [21] | Appl. No. | 15,770 |
| [22] | Filed | Mar. 2, 1970 |
| [45] | Patented | Nov. 30, 1971 |
| [73] | Assignee | Arvin Industries, Inc.<br>Columbus, Ind. |

[54] ADJUSTABLE MAGNIFYING MIRROR
15 Claims, 8 Drawing Figs.

[52] U.S. Cl. .................................................... 350/295,
60/62.5, 350/161, 350/296, 417/443
[51] Int. Cl. ...................................................... G02b 5/10,
F15b 7/00
[50] Field of Search .......................................... 350/295,
296, 289, 180, 312, 161; 60/62.5, 62.6; 417/443

[56] References Cited
UNITED STATES PATENTS

| 1,867,254 | 7/1932 | Curti | 60/62.5 |
| 2,189,554 | 2/1940 | Schweiss | 60/62.6 |
| 2,952,189 | 9/1960 | Pajaes | 350/295 |

*Primary Examiner*—David Schonberg
*Assistant Examiner*—John W. Leonard
*Attorney*—Trask, Jenkins & Hanley ABSTRACT: An adjustable magnifying mirror in which a flexible reflector is mounted by an airtight seal over a recess formed in a housing. A chamber is provided in the housing and carries a plunger movable therein. The chamber is connected through an air passage to the recess whereby movement of the plunger creates a differential pressure between the recess and the atmosphere causing the reflector to deform and change its magnification.

INVENTORS
BARRON C. MERTEN
GERMAIN G. PINS

BY Trask, Jenkins
& Hanley
ATTORNEYS

INVENTORS
BARRON C. MERTEN
GERMAIN G. PINS
BY
ATTORNEYS

PATENTED NOV 30 1971

INVENTORS
BARRON C. MERTEN
GERMAIN G. PINS
BY
*Trask, Jenkins & Hanley*
ATTORNEYS 3,623,793

ADJUSTABLE MAGNIFYING MIRROR

SUMMARY OF THE INVENTION

In accordance with one form of the invention, there is provided a housing having a support connected to its rear face and a recess formed in its front face. A flexible reflector extends over said recess and is connected to the housing by an airtight seal. Said housing is also provided with a chamber interconnected at one of its ends to said recess by an air passage. A plunger is slidably carried in said chamber and has an outwardly extending arm mounted thereon which projects through an elongated slot in the housing. Said arm is movable for moving the plunger within the housing to create a differential pressure between the recess and the atmosphere to thus cause the reflector to deform and change its magnification. The plunger is in tight sealing engagement with the chamber walls for releasably retaining the plunger in a fixed position therein and thus releasably retaining the deflector at the desired degree of magnification.

The air passage is in communication with the chamber at one end thereof. A normally closed valve is also mounted in the housing to control the flow of air between the chamber and the atmosphere. Said valve has a stem projecting into the chamber for engagement with the plunger whereby said valve can open to dispose the housing recess in communication with the atmosphere through the air passage, chamber, and valve to thus restore the housing recess to atmospheric pressure.

DETAILED DESCRIPTION OF THE DRAWINGS

The accompanying drawings illustrate the invention. In such drawings.

DETAILED DESCRIPTION OF THE PREFERRED EMBODIMENT

Figure 1:
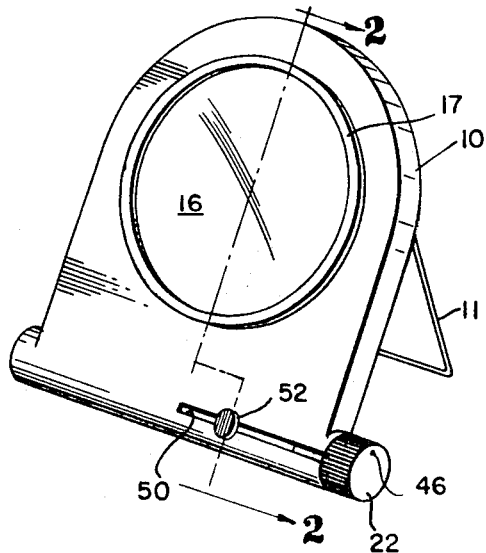
FIG. 1 is a perspective view of an adjustable magnifying mirror embodying the invention.
Figure 2:
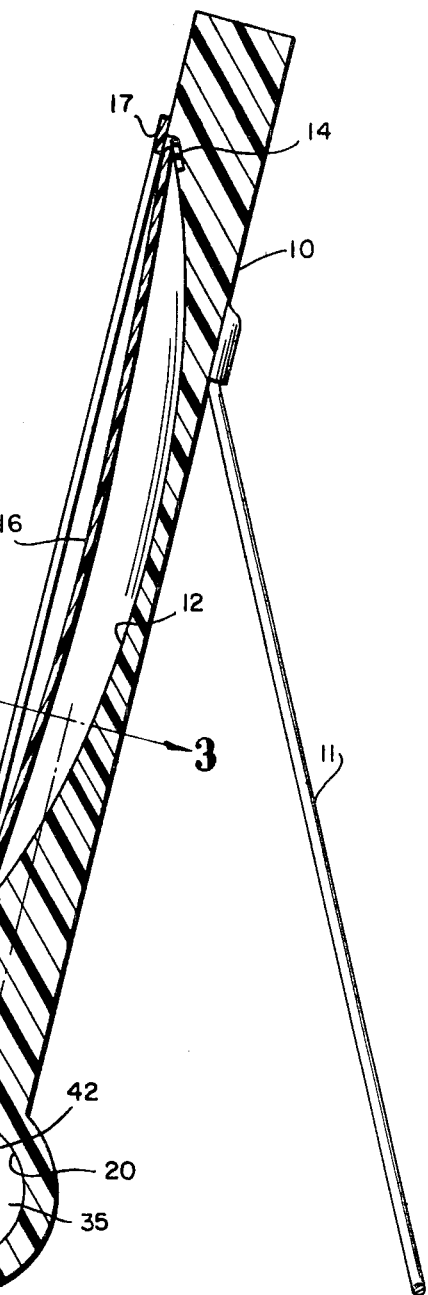
FIG. 2 is an enlarged vertical section taken on the line 2—2 of FIG. 1.
Figure 3:
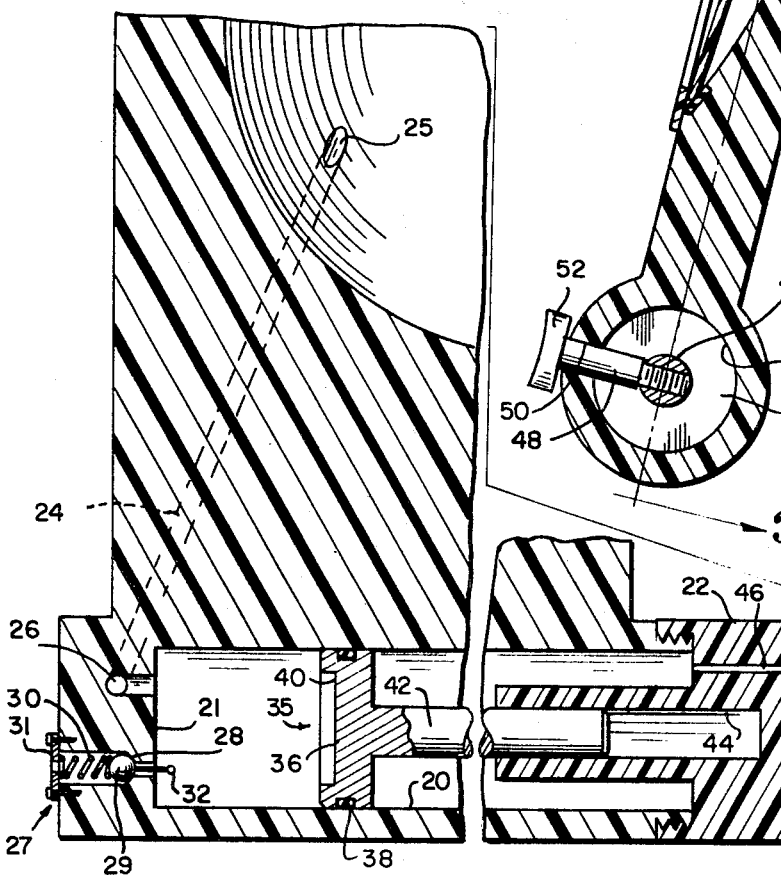
FIG. 3 is a fragmentary transverse section taken on the line 3—3 of FIG. 2.

In the embodiment illustrated in FIGS. 1–3, the mirror comprises a housing 10 having any type of conventional standard 11 connected to its rear face for supporting it in a viewing position. The front face of the housing has a circular recess 12 formed therein, and a gasket 14 is seated around the circumference of said recess. A flexible reflector 16 formed from a thin circular sheet of flexible plastic having a reflective coating on one face thereof extends over the recess 12. The edges of the reflector are supported against the gasket 14, and an annular frame 17 is mounted on the front housing face to extend over the peripheral edges of the reflector. The frame holds the reflector tightly against the gasket 14 to form an airtight seal around the space interposed between the reflector and recess.

As shown in FIGS. 2 and 3, a transversely extending chamber 20 is formed in the housing adjacent its lower end. One end wall of said chamber is formed by the housing, as at 21, and the opposite end wall of said chamber is formed by an end cap 22 threadably connected to said housing. As shown in FIG. 3, an air passage 24 extends through the housing from its port 25 within the extent of the recess 12 to its port 26 in the chamber end wall 21. In this manner, the chamber 20 and recess 12 are disposed in open communication with each other.

An air intake valve port 27 is formed in the chamber end wall 21 and extends from the chamber 20 to an outer face of the housing. Said valve port comprises a valve seat 28 against which a valve 29 is biased, as by a spring 30. A retainer ring 31 is mounted on the outer face of the housing and extends slightly inwardly over the edges of the valve port to engage the spring 30 so that said spring can act between said ring and the valve 29 for biasing it into a normally closed position against the valve seat 28. For reasons that will become more apparent hereinafter, a stem 32 substantially smaller in cross section than the valve port 27 is mounted on the valve 29 and projects through the valve port 27 into the chamber 20.

A plunger 35 is slidably carried in the chamber 20. As shown, said plunger comprises a piston head 36 having an O-ring 38 mounted thereon and disposed in tight sealing engagement with the sidewalls of chamber 20. The face of the piston head 36 adjacent the chamber end wall 21 has a concavity 40 formed therein having a diameter greater than the distance between the ports 26 and 27. The opposite face of the head 36 is connected to a shaft 42 slidably guided in an aligned well 44 formed in the inner face of end cap 22. Said end cap is also provided with an air passage 46 extending therethrough. The plunger 35 is slidable in the chamber 20 by an arm 48 projecting outwardly from the shaft 42 and slidably carried in an elongated transverse slot 50 formed in the front face of the housing 10. Conveniently, a finger grip 52 is mounted on the outer end of the arm 48 to facilitate sliding said arm along the length of the slot 50.

In order to increase the magnification of the reflector 16, the arm 48 is slid in the slot 50 to move the piston to the right as viewed in FIG. 3. During such movement, said piston will be guided by its shaft 42 sliding in the well 44, and the air in chamber 20 between the head 36 and end cap 22 will exit said chamber through the passage 46. During such movement, air will be evacuated from the space between reflector 16 and recess 12 through the air passage 24 to thus create a negative pressure differential between the recess and the atmosphere. This causes the reflector 16 to deform inwardly and thereby increase its magnification. The degree of reflector deformation, and thus reflector magnification, will depend upon the extent to which the plunger is moved within the chamber. The binding engagement between the plunger O-ring 38 and the side walls of the chamber 20 will releasably retain the plunger in the desired position of adjustment and thus releasably retain the pressure differential between the housing recess and the atmosphere.

To bring the air pressure in the recess to atmospheric pressure, the plunger 35 is slid to the left as viewed in FIG. 3. When the piston head is moved in such direction, it will engage the valve stem 32 causing it to displace the valve 29 from its seat 28 thereby permitting air to enter chamber 20 ahead of the piston head 36. The air entering the chamber is free to circulate through the space provided by the piston head concavity 40 and into the air passage 24 for movement into the recess 12. Preferably, the frictional engagement of the O-ring 38 with the side walls of chamber 20 is greater than the pressure created by the valve spring 30 so that said plunger will releasably retain the valve 29 in its open position for maintaining the recess at atmospheric pressure.

Figure 4:
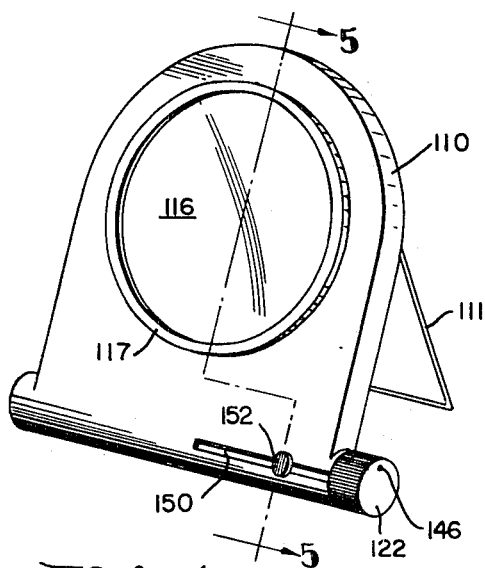
FIG. 4 is a perspective view of a modified form of the mirror shown in FIGS. 1–3.
Figure 5:
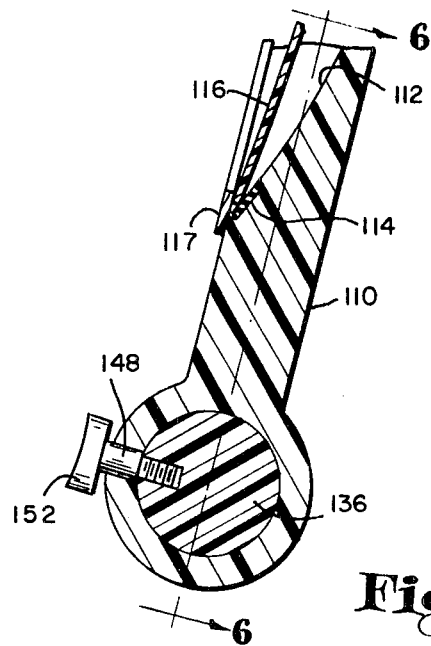
FIG. 5 is an enlarged vertical section taken on the line 5—5 of FIG. 4.
Figure 6:
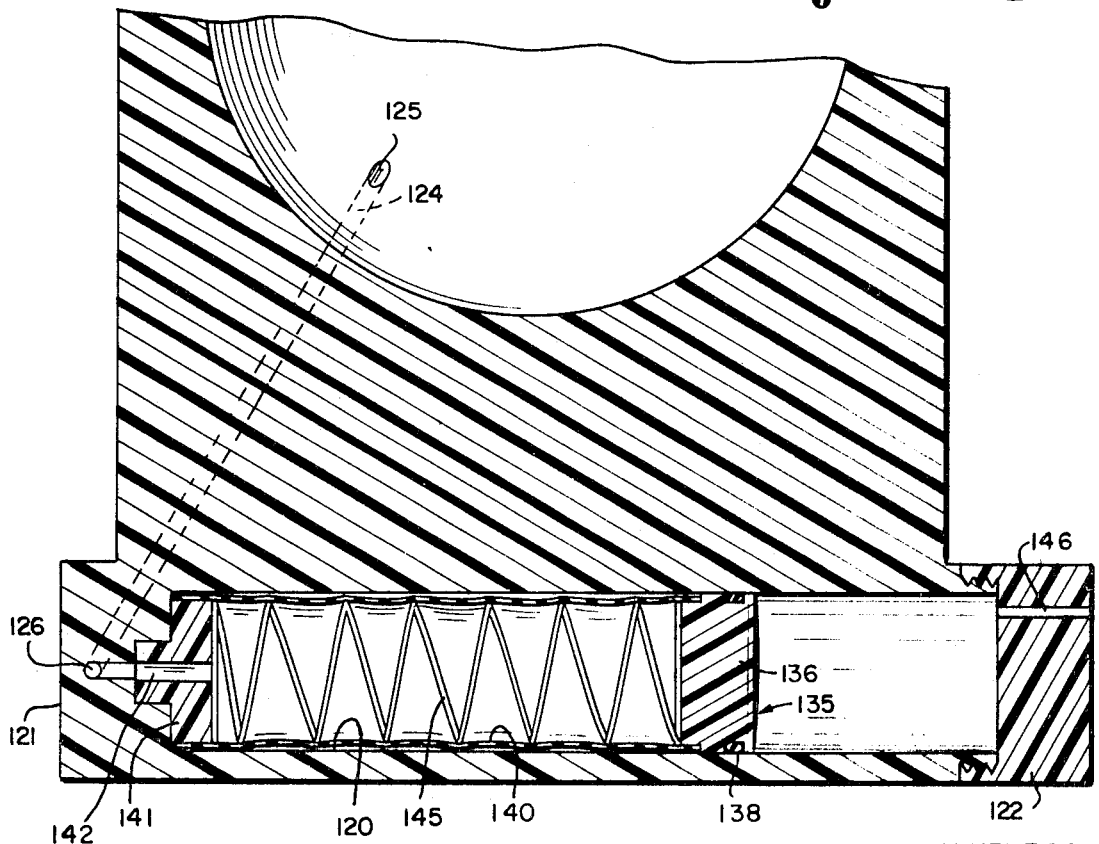
FIG. 6 is a transverse section taken on the line 6—6 of FIG. 5.

The embodiment of the invention illustrated in FIGS. 4–6 differs only from the embodiment shown in FIGS. 1–3 in the plunger assembly for effecting deformation of the reflector. Thus, in this embodiment, as in the embodiment shown in FIGS. 1–3, the housing 110 has a standard 111 connected to its rear face and is provided with a recess 112 in its front face. The flexible reflector 116 is held in airtight sealing engagement with a gasket 114 in the recess 112 by an annular frame 117 mounted on the housing.

A chamber 120 is formed in the housing adjacent its lower end with one end wall of said chamber being formed by the housing, as at 121, and the opposite end of said chamber being formed by an end cap 122 threadably connected to said housing. An air passage 124 extends through the housing from its port 125 within the extent of the recess 112 to its port 126 in the chamber end wall 121. A plunger 135 is slidably carried in the chamber 120. Said plunger comprises a head 136 having an O-ring 138 mounted thereon and disposed in tight sealing engagement with the side walls of chamber 120. The head 136 is connected to one end of a flexible air impermeable sleeve 140 having its opposite end connected to a nipple 141 seated against the chamber end wall 121 with its axially extending opening 142 disposed in open communication with the air passage port 126. A coil spring 145 is carried in the sleeve 140 with its opposed ends bearing against the adjacent faces of the head 136 and nipple 141. As shown, the spring 145 retains the sleeve 140 adjacent the sidewalls of the chamber 120.

An arm 148 is connected to the head 136 and projects outwardly therefrom through an elongated transverse slot 150 formed in the front face of the housing 110. Conveniently, a finger grip 152 is mounted on the outer end of the arm 148 to facilitate sliding said arm along the length of the slot 150.

In order to increase the magnification of the reflector 116, the arm 148 is slid in the slot 150 to move the head 136 to the right as viewed in FIG. 6 with the air in the chamber 120 between the head 136 and end cap 122 exiting said chamber through a passage 146 in said end cap. During such movement, air will be evacuated from the space between the reflector 116 and recess 112 through the passage 124 and into the sleeve 140 to thus create a negative pressure differential between the recess and the atmosphere. This causes the reflector 116 to deform inwardly and thereby increase its magnification. The binding engagement between the O-ring 138 and chamber sidewalls will releasably retain the head 136, and thus the sleeve 140 in the desired position of adjustment, and thus releasably retain the pressure differential between the recess 112 and the atmosphere at the desired value for providing the desired degree of reflector magnification.

When the arm 148 is slid to the left in slot 150, as viewed in FIG. 4, the head 136 will move toward the nipple 141 to force air outwardly from the sleeve 140 through the passage 124 and into the recess 112. Again, the O-ring 138 will releasably retain the head 136 in the desired position of adjustment along the length of the chamber 120.

Figure 7:
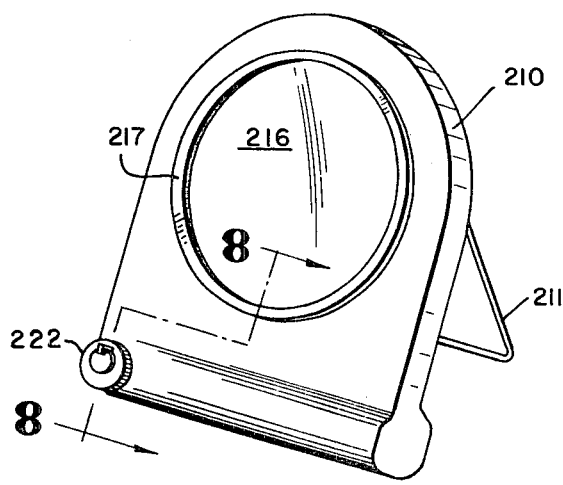
FIG. 7 is a perspective view of another modified form of the mirror shown in FIGS. 1–3.
Figure 8:
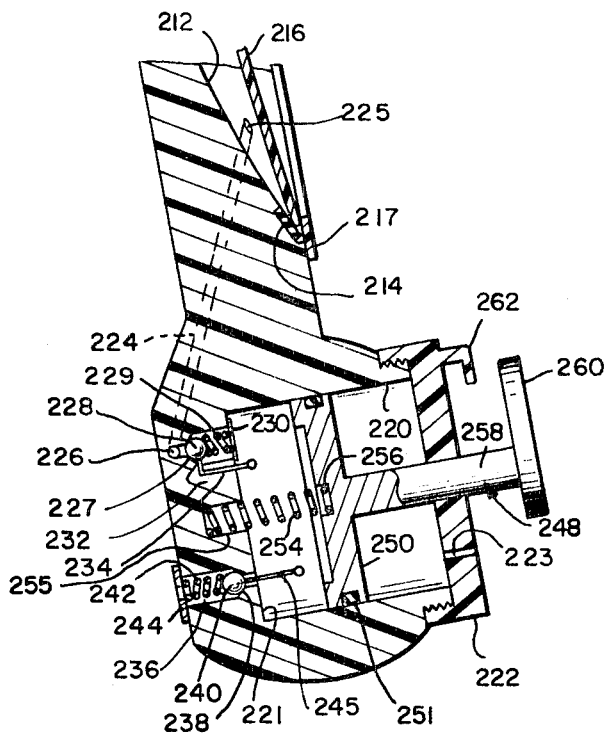
FIG. 8 is an enlarged vertical section taken on the line 8—8 of FIG. 7.

The embodiment of the invention illustrated in FIGS. 7 and 8 differs only from the embodiments shown in FIGS. 1–6 in the plunger assembly for effecting deformation of the reflector. As in the other embodiments, the housing 210 has a standard 211 connected to its rear face and is provided with a recess 212 in its front face. The flexible reflector 216 is held in airtight sealing engagement with a gasket 214 in the recess 212 by an annular frame 217 mounted on the housing.

A chamber 220 is formed in the housing adjacent its lower end with one end wall of said chamber being formed by the housing, as at 221, and the opposite end wall of said chamber being formed by an end cap 222 threadably connected to said housing. As shown, said end cap has an air passage 223 extending therethrough. Another air passage 224 extends through the housing from its port 225 within the extent of the recess 212 to its port 226 in the chamber end wall 221. As shown in FIG. 8, the port 226 is provided with a valve seat 227 against which a ball valve 228 is carried. The valve 228 is releasably retained against valve seat 227 by a coil spring 229 having one of its ends bearing against said valve and its opposite end against a retainer ring 230 mounted on the chamber end wall 221 around the periphery of the valve port 226. The valve port 226 has an elongated slotted extension 232 extending radially therefrom. A L-shaped valve stem 234 is carried in the extension 232 with one of its ends connected to the valve 228 and its opposite end projecting into the chamber 220. Thus, the valve assembly 226–234 constitutes an exhaust valve for controlling the movement of air to and from the recess 212 through the passage 224.

An air-intake valve assembly is also mounted in the housing to control the flow of air between the chamber 220 and the atmosphere. As shown in FIG. 8, said air-intake valve assembly comprises a valve port 236 open at one of its ends to the atmosphere and at its opposite end to the chamber 220 through the chamber end wall 221. It comprises a valve seat 238 against which a ball valve 240 is releasably retained by a coil spring 242 having one of its ends bearing against said valve and its opposite end bearing against a retainer ring 244 mounted on the exterior of the housing and extending around the periphery of the port 236. As shown, the valves 240 and 228 are biased in opposite directions toward their closed positions. A valve stem 245 substantially longer than the stem 234 is connected to the valve 240 and projects through the valve port 236 into the chamber 220.

A plunger 248 is carried in the chamber 220 and comprises a piston head 250 provided with an O-ring 251 in sealing engagement with the sidewalls of chamber 220. A concavity 252 having a diameter greater than the distance between the exhaust and air-intake valve assemblies is formed in the face of the piston head 250 adjacent the housing end wall 221. The piston head is biased outwardly away from wall 221 by a spring 254 having its ends seated in axially aligned wells 255 and 256 formed in the end wall 221 and piston head 250.

A shaft 258 extends outwardly from the piston head 250 and is slidably guided and carried in an opening in the end cap 222. The outer end of said shaft has an eccentrically mounted cap mounted thereon. A L-shaped finger 262 is mounted on the outer face of the end cap 222. Thus, the eccentric cap 260 is rotatable into a position in which a portion of it is disposed under the finger 262 to thus lock the plunger 248 against axial movement. When the cap 260 is rotated to clear the finger 262, the plunger will be free to be moved axially within the chamber 220. However, because of its eccentric mounting, the cap can be rotated into a position such that as the plunger is moved toward the wall 221, the cap 260 will engage finger 262 and thus prevent the piston head 250 from moving through a full inward stroke to a position in which it abuts the end wall 221.

In the operation of the mirror shown in FIGS. 7 and 8 to increase the magnification of the reflector 216, the cap 260 is rotated to dispose its eccentric portion out from under the finger 262 whereupon the plunger 248 is biased to the right by the spring 254. During such movement, the air to the right of the piston head 250 will exit the chamber 220 through the end cap passage 223. The plunger cap 260 is again rotated to bring its eccentric portion in alignment with the finger 262 to prevent said plunger from operating through a full stroke in which the head 250 would seat against the chamber end wall 221. As the plunger moves to the right, a vacuum will be created in the chamber 220 between its end wall 221 and the piston head 250. This vacuum creates a pressure differential between the recess and chamber sufficient to overcome the biasing effect of spring 229 so that the air will be evacuated from the recess 212 through the passage 224 and open valve 228.

As the plunger is moved to the left in FIG. 8 on its return stroke, the head 250 will engage valve stem 245 to open the valve 240 and thus force the air evacuated from the recess 212 outwardly through the air-intake valve assembly 236. By reason of the plunger cap 260 having been rotated to engage the finger 262, the plunger will be prevented from moving through a full return stroke and engaging valve stem 234 for thus opening the exhaust valve assembly. With the air thus evacuated from the chamber between the head 250 and valve assemblies, movement of the plunger again to the right as viewed in FIG. 8 will cause another quantity of air to be evacuated from the recess 212 through the passage 224 and into the chamber 220. This pumping action of the plunger is repeated until the desired vacuum is created in the recess 212 to produce the desired degree of deformation and magnification of the reflector 216.

To return the pressure in the recess 212 to atmospheric pressure, the cap 260 is rotated so that as it is moved to the left in FIG. 8, it will clear the finger 262. This permits the piston head 250 to seat against the chamber end wall 221. As the piston head is moved into this seated position, it will engage valve stem 245 to open the valve 240. As it moves further toward the wall 221, it will engage valve stem 234 causing said valve stem to pivot downwardly as viewed in FIG. 8 in the valve port extension 232 for thus opening the valve 227. With both the valves 240 and 227 in open positions, air under atmospheric pressure is free to flow through the air-intake valve assembly into the piston head concavity 252 and then through the exhaust valve port assembly to the air passage 224 and recess 212. The plunger can be locked in such position with the recess 212 in open communication with the atmosphere by again rotating the cap 260 to dispose a portion thereof under the finger 262.

While the embodiments shown in FIGS. 1-3 and 4-6 employ the O-rings 38 and 138 to releasably retain their plungers in the desired positions of adjustment, it is to be understood, of course, that other means may be employed for this purpose, such as for example, a tight frictional interfit between arms 48 and 148 and the housing slots in which they slide.

We claim:

1. A mirror adapted to provide variable magnification, comprising a housing having a recess formed in one of its faces, a flexible reflector extending over said recess, means forming an airtight seal between said reflector and housing, a chamber in said housing, an air passage extending between said recess and chamber, a plunger carried in said chamber and movable therein for creating a differential pressure between said recess and the atmosphere whereby said reflector will deform to change its magnification, said plunger comprising a piston head, a nipple connected to said air passage, and a compressible air impermeable sleeve extending between said piston head and nipple, means connected to said plunger and extending outwardly from said housing for moving said plunger with respect to said housing, and means for releasably retaining said plunger in a fixed position with respect to said housing.

2. The invention as set forth in claim 1 with the addition that a coil spring is carried in said sleeve with its opposed ends engaging said nipple and piston head.

3. The invention as set forth in claim 1 in which said means connected to the plunger comprises an arm connected to said plunger and slidably carried in a slot formed in said housing.

4. A mirror adapted to provide variable magnification, comprising a housing having a recess formed in one of its faces, a flexible reflector extending over said recess, means forming an airtight seal between said reflector and housing, a chamber in said housing, an air passage extending between said recess and chamber, normally closed air-intake valve means on said housing for interconnecting said chamber to the atmosphere, a plunger moveably carried in said chamber for creating a pressure differential between said recess and the atmosphere whereby said reflector will deform to change its magnification, means connected to said plunger and extending outwardly from said housing for moving said plunger with respect to said housing, and means for releasably retaining said plunger in a fixed position with respect to said housing.

5. The invention as set forth in claim 4 in which said valve means and air passage are disposed at one end of said chamber, and said air-intake valve means comprises a valve port having a valve seat, a valve biased against said seat, a stem on said valve projecting into said chamber for engagement with said plunger whereby said valve can open to dispose said recess in communication with the atmosphere through said air passage, chamber, and valve port.

6. The invention as set forth in claim 4 in which said valve means and air passage are disposed at one end of said chamber, said air-intake valve means comprises a valve port having a valve seat, a valve biased against said seat, a stem on said valve projecting into said chamber for engagement with said plunger whereby said valve can open to dispose said recess in communication with the atmosphere through said air passage, chamber, and valve port and said plunger has a piston head provided on its face adjacent said valve means with a concavity having a diameter greater than the distance between said valve stem and air passage.

7. The invention as set forth in claim 4 in which said plunger comprises a piston head having a shaft connected thereto, guide means are provided for guiding the movements of said shaft, and said means for releasably retaining the plunger in fixed position comprises an O-ring on said piston head engaging the walls of said chamber.

8. The invention as set forth in claim 4 in which said air passage is connected to said chamber through a normally closed exhaust valve means, said air-intake and exhaust valve means being adapted to be closed and opened, respectively, when said plunger is moved in operating stroke in one direction and opened and closed, respectively, when said plunger is moved in an operating stroke in an opposite direction.

9. The invention as set forth in claim 8 with the addition that means are provided for biasing said plunger in said one direction.

10. The invention as set forth in claim 4 in which said air passage is connected to said chamber through normally closed exhaust valve means having a first valve stem projecting into one end of said chamber, a second valve stem on said air-intake valve means projecting farther into said one chamber end than said first valve stem, said exhaust valve means being adapted to open when said plunger is moved in one direction for evacuating air from said recess into said chamber, said plunger being engageable with said second valve stem upon movement of said plunger in an opposite direction to force air from said chamber, and means for selectively limiting movement of said plunger in said opposite direction to prevent said plunger from engaging said first valve stem to open said exhaust valve means when said second valve stem is engaged to said air-intake valve means.

11. The invention as set forth in claim 10 in which said plunger has a shaft projecting outwardly from said housing, and said shaft and housing have means thereon selectively engageable with each other for limiting movement of said plunger in said opposite direction.

12. The invention as set forth in claim 4 in which said air passage is connected to said chamber through a normally closed exhaust valve means, each of said air-intake and exhaust valve means comprising a valve port having a valve seat, a valve having a valve stem projecting into one end of said chamber, and a spring biasing said valve against said valve seat, the valve stem on said air-intake valve means projecting farther into said chamber than the stem on said exhaust valve means whereby when said plunger is moved in an operating stroke in one direction a vacuum will be created overcoming the action of the spring in said exhaust valve means to open the valve therein and draw air into said chamber from said recess and when said plunger is moved in a limited operating stroke in an opposite direction it will engage the valve stem on said air-intake valve means to open the valve therein and force air in said chamber through said air-intake valve means.

13. The invention as set forth in claim 12 with the addition that means are provided for limiting movement of said plunger in said opposite direction and for releasably locking said plunger in a position engaging both of said valve stems for releasably retaining said air-intake and exhaust valves in open positions.

14. The invention as set forth in claim 13 in which said plunger has a shaft projecting outwardly from said housing and provided with an eccentrically mounted cap rotatable with respect to said housing, and a finger on said housing adapted to lock over said cap for releasably locking said plunger against axial movement in said chamber and adapted to engage said cap for limiting movement of said plunger in said opposite direction.

15. The invention as set forth in claim 4 with the addition that said air passage is interconnected to said chamber through normally closed exhaust valve means, means for opening said exhaust valve means and closing said air-intake valve means when said plunger is moved in one direction, and means for successively opening first said air-intake valve means and secondly said exhaust valve means when said plunger is moved in an opposite direction.

* * * * *